Figures 1, 2:
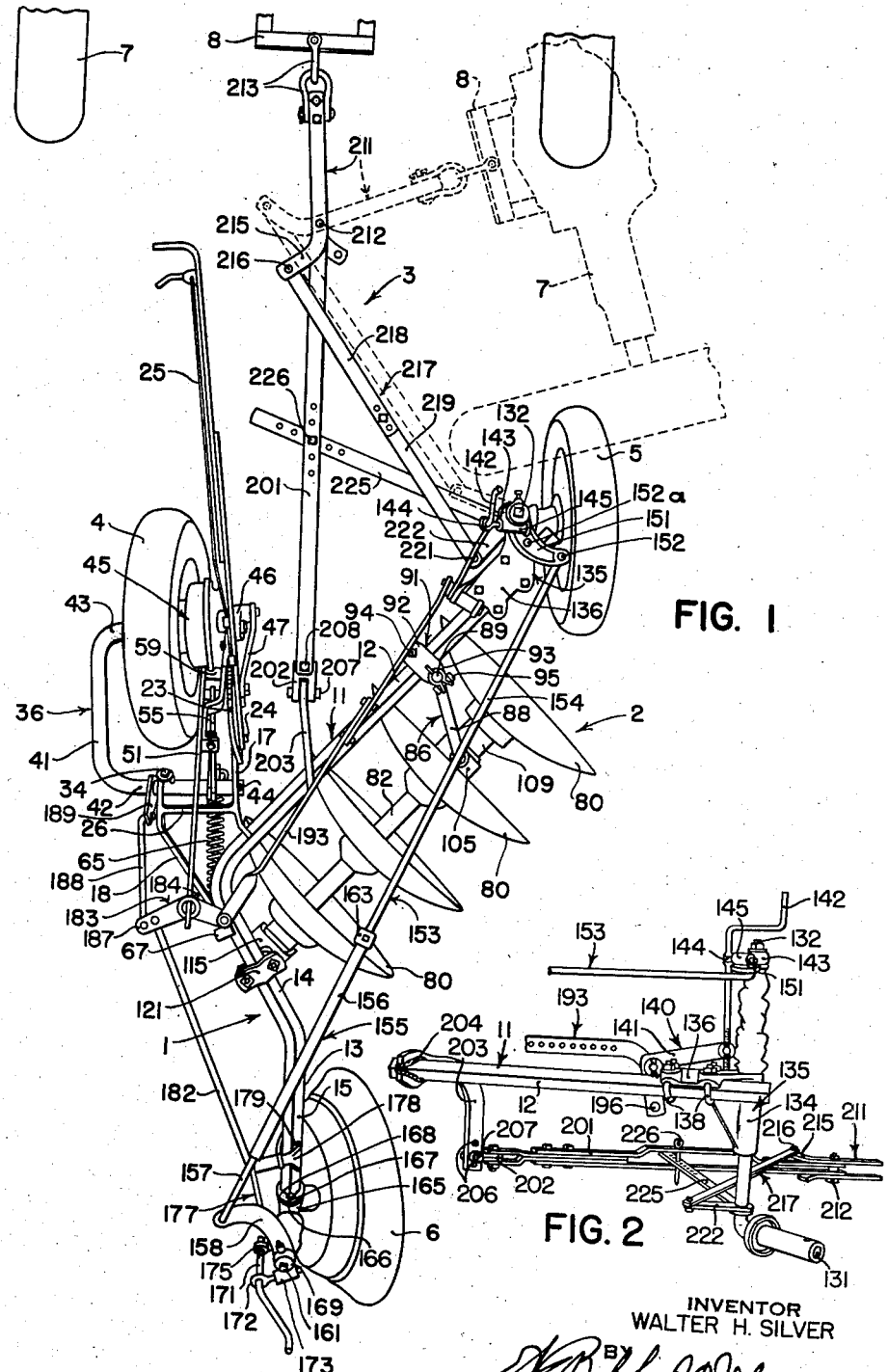

May 22, 1945.

W. H. SILVER 2,376,455

DISK TILLER

Original Filed Aug. 20, 1941

INVENTOR
WALTER H. SILVER
BY
ATTORNEYS

Patented May 22, 1945

2,376,455

UNITED STATES PATENT OFFICE 2,376,455

DISK TILLER

Walter H. Silver, Moline, Ill., assignor to Deere & Company, Moline, Ill., a corporation of Illinois Original application August 20, 1941, Serial No. 407,549. Divided and this application June 29, 1942, Serial No. 449,007

9 Claims. (Cl. 97—181)

This application is a division of my co-pending application, Serial No. 407,549, filed August 20, 1941, for Disk tiller.

The present invention relates generally to agricultural implements and more particularly to disk tillers, sometimes referred to as disk plows or harrow plows. The object and general nature of the present invention is the provision of improved steering connections for disk tillers and the like, whereby the implement may more easily be controlled, both in the raised and lowered positions. A further feature of this invention is the provision of means associated with the front and rear furrow wheels whereby, during operation, both may be steered by the implement hitch but in which the parts may be so arranged that, during transport, only the front furrow wheel is steered, the connections serving to hold the rear furrow wheel against steering movement. This serves to stabilize the implement during transport.

These and other objects and advantages of the present invention will be apparent to those skilled in the art after a consideration of the following detailed description, taken in conjunction with the accompanying drawing in which the preferred embodiment of this invention has been illustrated.

In the drawing:

Figure 1 is a top perspective of a disk tiller in which the principles of the present invention have been incorporated; and Figure 2 is a perspective fragmentary view, the front furrow wheel being removed, showing the steering connections for the front furrow wheel.

Referring now to the drawing, the present invention has been illustrated as incorporated in a disk tiller which, in general, includes a frame structure 1, a gang of disks 2, a hitch device 3 and supporting wheels 4, 5 and 6. The tiller is adapted to be hitched to a tractor or other source of power indicated by the reference numeral 7, the latter having a drawbar 8 to which the forward end of the hitch device 3 is connected.

The frame 1 of the disk tiller comprises a frame bar 11 having a main portion 12 which is disposed generally diagonally and a rear portion 13, the forward part 14 of which extends generally diagonally in the other direction, more or less at a right angle to the section 12, the rear portion of the frame section 13 extending generally directly rearwardly, as indicated at 15. A pair of brackets 17 and 18 are welded or otherwise secured to the frame beam 11 in generally laterally spaced apart relation, the brackets 17 and 18 being formed so that, as best shown in Figure 1, they extend laterally outwardly and forwardly with respect to the beam 11, being secured to the latter substantially at the junction between the two diagonal sections 12 and 14. The laterally inner bracket 17 supports a sector 23 to which a master depth controlling lever 25 is pivoted, as at 24, and which carries the usual detent mechanism cooperating with the sector 23. A brace 26 is welded to the two brackets 17 and 18 to give them lateral rigidity. The bracket 17 includes an opening to receive the inner end of a crank axle 36, and the other bracket 18 is formed with a slot which is open at one end, the forward portions of the bracket on opposite sides of the slot being turned backwardly to form generally vertically aligned openings in which a bolt 34 is disposed. The bolt 34 is removable to provide for insertion and removal of the crank axle 36.

The crank axle 36 comprises a generally U-shaped member 41 having an end portion 42 disposed for rocking movement in the brackets 17 and 18 and is held in place by a pin 44. The other end portion 43 of the crank axle 36 is provided with suitable journal means receiving the land wheel 4 of the tiller. The latter wheel is connected to drive a power lift clutch mechanism, indicated in its entirety by the reference numeral 45. The particular details of the clutch 45 do not per se form any part of the present invention, being disclosed and claimed in my co-pending application, Serial No. 391,918, filed May 5, 1941, to which reference may be had if necessary. The implement parts shown in said co-pending application are portions of the present implement. The clutch mechanism 45 includes a driven crank member 46 that is connected by a link 47 with the master depth adjusting lever 25. As will be understood by those familiar with agricultural implement power lift clutches, a half revolution of the crank 46 resulting from the rotation of the land wheel 4 causes the crank axle 36 to rock upwardly and downwardly in its rocking support in the brackets 17 and 18. The clutch 45 is controlled by a trip lever 51 which is pivoted on the lower end of a downwardly and forwardly extending arm 55, the upper end of which is apertured to receive the section 42 of the crank axle 36. At its lower end, the trip lever 51 carries a roller 59 which controls the operation of the power lift clutch 45. A cable extends forwardly from the upper end of the trip lever 51 to the operator's station on the tractor 7. A counterbalancing spring 65 is connected at its forward end to the arm 55, and at its rear end the counterbalancing spring 65 is adjustably connected with a depending bracket 67, the upper end of which is welded or otherwise secured to the rearwardly extending section 14 of the frame beam 11.

The disk gang 2 includes a plurality of soil working disks 80 of conventional construction, the disks being mounted on a gang shaft whereby the disks are supported for simultaneous rotation. Suitable spacing spools 82 are disposed on the gange shaft between the disks. The disk gang 2 is connected with the frame 1 by front and rear supports indicated in Figure 1 by the reference numerals 86 and 87, respectively. The front disk gang support 86 comprises a swinging crank or link member 88 having at its forward end an upturned portion 89 which is secured by a clamp casting 91 to the forward portion of the diagonal frame section 12. The clamping member 91 includes two parts, one part indicated by the reference numeral 92 embracing the diagonal beam section 12 while the other part 93 embraces the upturned end 89 of the swingable link or crank member 88. Each of the sections 92 and 93 is split and is provided with a clamping bolt by which the parts may be securely fixed to the frame beam or the member 88. Referring to Figure 1, the clamping bolt for the clamping section 92 is indicated by the reference numeral 94 and the clamping bolt for the other section 93 is indicated by the reference numeral 95.

The member 88 includes a downturned spindle portion that is disposed for rocking movement in an upwardly extending sleeve that is welded to a yoke 105 by which a gang shaft bearing 109 is connected to the front support 86.

The other support member 87, for the rear end of the disk gang 2, is of similar construction, including a yoke member 115 pivoted to the rear gang shaft bearing and having a vertically disposed sleeve section in which the lower end of a bracket or support member is disposed, the upper end of the latter carrying clamping means 121 by which the standard or support 87 may be secured to the rearwardly extending section 14 of the frame beam 11, as more completely shown in my parent application mentioned above.

The front furrow wheel 5 is journaled for rotation on the lower outturned stub shaft section 131 of a vertical spindle 132. The latter is received for vertical sliding movement in a sleeve 134 forming a part of a casting 135 having a clamping section 136 that is adapted to be secured to the forward end of the draft beam 11 by any suitable means, such as a pair of U-bolts 138. A bell crank 140 has one arm 141 connected to the lower end of a crank screw 142, the upper end of which is anchored in a cap member 143 by any suitable means, such as an eye bolt 144 rockably received in a sleeve section 145 of the cap 143. Rocking of the bell crank 140, as will be referred to later, reacts through the adjusting crank screw 142 against the upper end of the spindle 132 for the purpose of raising and lowering the front end of the frame relative to the front furrow wheel 5. In Figure 1, the parts are shown in their raised or transport position.

An arm 151 is fixed in any suitable manner to the upper end of the front furrow wheel spindle 132 and is apertured at its outer end to receive the upturned end 152 of a generally longitudinally extending link 153. The latter member is made up of a pair of telescopically associated rod sections 154 and 155, the latter including a sleeve section 156, the rear end of which is secured to a rod 157 having a downturned end disposed in an aperture in the outer end of an arm 158 secured to the upper end of a spindle 161 on the lower end of which the rear furrow wheel 6 is journaled. A set screw collar 163 at the forward end of the sleeve section 156 serves to retain the link members 154 and 155 in adjusted position. It will be noted from Figure 1, that the arms 151 and 158 extend generally in opposite directions, whereby if, for example, the front furrow wheel 5 should be turned in a clockwise direction, the rear furrow wheel 6 would be turned in a counterclockwise direction.

The axle construction for the rear furrow wheel 6 is substantially the same as that for the front furrow wheel 5. A sleeve member 165 receives the vertical portion of the spindle 161 and is provided with a pad 166 which is bolted, as at 167, to a corresponding pad 168 secured, as by welding, to the rear end of the longitudinal frame bar section 15. The spindle section 161 extends upwardly through the sleeve section 165 and carries a cap 169 at the upper end to which a crank screw 171 is anchored, as by an eye bolt 172 received in a sleeve section 173 on the cap 169. The lower threaded end of the crank screw 171 is screwed into a nut member 175 which is pivoted to one arm of a bell crank 177. The latter is mounted for rocking movement on a bracket 178 that is welded, as at 179, to the rear end of the frame bar section 11.

The other arm of the bell crank 177 is bent generally downwardly and connected by a rod 182 (Figure 1) to a horizontally disposed bell crank 183 journaled for rocking movement on a bracket 184 secured to the frame bar 11 in any suitable manner, preferably by welding, to the side of the laterally outer crank axle bracket 18. One arm 187 of the bracket 183 is connected by a link 188 to an arm 189 fixed, as by welding, to the laterally outer part of the crank axle section 42. The other arm of the bell crank lever 183 is connected by a link member 193 to the downwardly extending arm of the bell crank 140 associated with the front furrow wheel 5. Preferably, the link member 192 consists of two strap sections, the front section (Figure 2) having a downturned end pivoted, as at 196, to a pin carried on the lower arm of the bell crank 140. The link sections may be connected together in different positions of adjustment to vary the effective length thereof.

As will be clear from the above description, whenever the power lift clutch 45 is operated to cause the crank axle 36 to rock in a generally vertical direction, the upper end of the arm 189 shifts in a generally longitudinal direction, causing the bell crank 183 to rock, the rocking movement of the latter member is transmitted through the link members 182 and 193 to the front and rear furrow wheel bell cranks 140 and 177, thereby raising and lowering the tiller frame substantially the same amount with respect to all three of its supporting wheels.

As mentioned above, the front and rear furrow wheels are mounted for swinging movement about vertical axes, as defined by their vertical spindle sections 132 and 161, one wheel being turned in one direction while the other wheel is turned in the other direction. This action is made use of to secure a steering control which permits the tractor and tiller to be turned in a much shorter radius than is ordinarily possible with tillers and like implements.

Referring now more particularly to Figure 1, the hitch construction 3 includes a main draft transmitting member 201 connected by a swivel 202 to the lower end of a draft bracket 203, the upper end of which is welded, as at 204, to the intermediate portion of the draft beam 11. The lower end of the draft bracket 203 is provided with a plurality of openings 206 to receive a bolt 207 by which the swivel 202 may be connected to the member 203 in different vertical positions. The swivel 202 is connected to the rear end of the draft transmitting member 201 by a vertical pivot bolt 208. A laterally swingable hitch member 211 is connected by a pivot member 212 to the forward end of the main draft transmitting member 201. The forward end of the hitch member 211 is connected by any suitable means, such as clevis members 213, to the draft bar 8 of the tractor 7, and the rear end of the hitch member 211, rearwardly of the pivot 212, is provided with a laterally and rearwardly extending arm 215 which is apertured to receive a pivot member 216 by which the forward end of a steering link 217, which preferably consists of two adjustably connected sections 218 and 219 whereby the effective length of the steering link 217 may be adjusted, is connected thereto. The rear end of the steering link section 219 is pivoted, as at 221, to a steering arm 222 preferably welded to the lower end of the front furrow wheel spindle 132 just above the juncture with the laterally directed stub axle section 131, on which the wheel 5 is journaled. A diagonal brace bar 225 is connected by a pin 226 with the main draft transmitting member 201, and at the other end the bar 225 is apertured and is disposed above the lower end of the steering wheel spindle 132, below the steering arm 222, preferably between the stub axle section 131 and the steering arm, as best shown in Figure 2. Thus, the diagonal brace bar 225 extends substantially directly between the main draft transmitting member 201 and the wheel 5, whether the frame of the tiller be raised or lowered. In the lowered position, the lower end of the frame sleeve 134 is closely adjacent the steering arm 222 and the diagonal brace bar 225. Hence, the link 225 is effective to cooperate with the main draft transmitting member 201 when the disks are lowered into operating position.

The operation of the implement described above is substantially as follows:

Figure 1 shows the parts in operating position, the front furrow wheel 6 running in the furrow opened by the rearmost disk 80 on the previous round. The front and rear adjusting crank screws 142 and 171 may be turned to level the tiller in operation, the rear crank screw 171 being adjusted so that the rear furrow wheel 6 is approximately level with the bottom edge of the disks. The plurality of holes in the left hand of the diagonal brace bar 225 permits the pin 226 to be disposed in various positions so as to accommodate various widths of tractors. The disk tiller of the present invention is particularly adapted for use in close quarters due, first, to the fact that turning of the tractor in one direction or the other swings the hitch member 211, which causes the front and rear furrow wheels to turn in opposite directions, and second, by virtue of the fact that the steering arm 215 of the member 211 and the steering arm 222 of the front furrow wheel spindle 132 are directed generally laterally and rearwardly, which disposes the steering link 217 in a position well out of the way of the rear wheels of the tractor, even though a sharp turn to the right is made. Referring to Figure 1, it will be seen that if the tractor is turned to the right, the front furrow wheel 5 will be turned to the right, but that the rear furrow wheel 6 will be turned to the left, with the result that the rear end of the tiller is turned much more rapidly than would be the case if only one of the wheels, such as the front furrow wheel 5, should be steered by the turning of the tractor.

This rapid steering action of the implement is not necessary, and may not be desirable, when transporting the implement. To the end of providing an implement that may be made quite stable for movement at relatively high speed in transport position, I provide a second opening 152a (Figure 1) in the front furrow wheel arm 151 closely adjacent the axis of the spindle 132 so as to secure as little movement as possible. When arranging the machine for transport, the front end 152 of the steering link 153 is removed from the outer end of the arm 151 and inserted in the opening 152a. This opening is placed so that steering movement of the front furrow wheel 5 will affect the rear furrow wheel 6 very little if any. Thus, when arranged for transport, the tractor turns the front furrow wheel 5 but does not turn the rear wheel to any appreciable extent. The effective length of the steering link 217 may be adjusted by shifting the positions of the members 218 and 219 for the purpose of landing the front furrow wheels. The position of the tractor 7 in dotted lines in Figure 1 shows the clearance between the steering link 217 and the right rear tractor wheel of the tractor when making a sharp turn.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. An agricultural machine comprising frame means having a vertical spindle receiving sleeve section, a vertically disposed wheel spindle mounted in said sleeve section, said spindle including a laterally outwardly bent section at its lower end and a steering arm, a ground wheel journaled for rotation on said laterally outwardly bent section, a draft transmitting member connected at its rear end with said frame means, a laterally swingable hitch member pivoted to the forward end of said draft transmitting member and including an arm link-connected with said steering arm, whereby lateral swinging movement of said hitch member serves to turn said wheel spindle, means for raising and lowering said frame means relative to said spindle, and a laterally extending link connected at one end with said draft transmitting member and disposed at the other end about the lower end of said spindle below said steering arm, whereby the lower end of said spindle is braced against lateral deflection in any raised position of said frame means.

2. The invention set forth in claim 1, further characterized by dirigible wheel means connected with the rear of said frame means and including a vertically disposed rockable spindle having an arm, an arm on the upper end of said first mentioned wheel spindle, link means connecting said last mentioned arms, said laterally swingable hitch member acting through said first mentioned spindle for steering both wheels, said laterally extending link serving to transmit the action of the steering movement of said draft transmitting member from the lower end of said spindle in any raised position of the frame means.

3. An agricultural machine comprising frame means including a vertical sleeve section, a vertically disposed wheel spindle rockably mounted in said sleeve section and having at its lower end wheel receiving stub shaft means, means for raising and lowering said frame means relative to said spindle in a generally vertical direction, a bracing link apertured at one end and having said end disposed about the lower end of said spindle above said wheel receiving stub shaft section, a steering arm fixed to said spindle above said bracing link, whereby the latter is held in connection with the lower end of the spindle in any raised position of said frame means, and draft transmitting means receiving the other end of said bracing link and connected at its rear end with said frame means.

4. In an agricultural machine, support means, a steering wheel spindle mounted for generally vertical adjustment relative to said support means, a steering arm fixed to the lower end of said spindle, a draft member connected with said support means, and a link connected at its rear end with said spindle below said steering arm and with said draft member.

5. In an agricultural machine, support means, a steering wheel spindle mounted for generally vertical adjustment relative to said support means, a steering arm fixed to the lower end of said spindle, a draft member connected with said support means, and a link having an apertured rear end embracing said spindle closely adjacent said steering arm and connected adjacent its other end with said draft member.

6. An agricultural machine comprising frame means including a vertical sleeve section, a vertically disposed wheel spindle rockably mounted in said sleeve section and having at its lower end wheel receiving stub shaft means disposed appreciably below said sleeve section, a bracing link apertured at one end and having said end disposed loosely about the lower end of said spindle above said wheel receiving stub shaft section, a steering arm fixed to said spindle above said bracing link, whereby the latter is held in connection with the lower end of the spindle, and draft transmitting means receiving the other end of said bracing link and connected at its rear end with said frame means.

7. An agricultural machine comprising frame means including a vertical sleeve section, a vertically disposed wheel spindle rockably mounted in said sleeve section and having at its lower end wheel receiving stub shaft means, a bracing link apertured at one end and having said end disposed loosely about the lower end of said spindle above said wheel receiving stub shaft section, and a steering arm fixed to said spindle above said bracing link, whereby the latter is held in connection with the lower end of the spindle.

8. An agricultural machine comprising frame means, a generally vertically shiftable steering wheel spindle connected with said frame means, a steering wheel journaled on the lower portion of said spindle, a steering arm connected with said spindle, a draft transmitting member connected at its rear end with said frame means, a laterally swingable hitch member pivoted to the forward end of said draft transmitting member and including an arm link-connected with said steering arm, whereby lateral swinging movement of said hitch member serves to turn said wheel spindle, means for raising and lowering said frame means relative to said spindle, and a laterally extending bracing link connected at one end with said draft transmitting member and disposed at the other end about the lower end of said spindle so as to be pivotally connected therewith about the axis of said spindle, whereby the lower end of said spindle is braced against lateral deflection in any raised position of said frame means.

9. An agricultural implement comprising frame means, a draft transmitting member connected at its rear end with said frame means, a laterally swingable hitch member connected to the forward end of said draft transmitting member for lateral swinging movement relative thereto, a generally vertically disposed wheel spindle mounted for both rocking and generally vertical movement in said frame means, a ground engaging wheel carried by said spindle and steered by rocking movement of the latter, a steering arm on said spindle extending generally laterally rearwardly and inwardly relative to said frame means, a laterally extending bracing link connected at one end with said draft transmitting member and disposed at the other end about the lower end of said spindle below said steering arm, whereby the lower end of said spindle is braced against lateral deflection in any raised position of said frame means, a generally laterally and rearwardly extending arm on said laterally swingable hitch member, and a steering link passing over said bracing link and connecting said arms, the latter supporting said steering link in a position adjacent the center line of the implement, whereby the rear tractor wheels clear said link when making turns.

WALTER H. SILVER.